(12) United States Patent
Lee et al.

(10) Patent No.: US 10,133,135 B2
(45) Date of Patent: *Nov. 20, 2018

(54) LIQUID CRYSTAL DISPLAY DEVICE

(71) Applicant: LG CHEM, LTD., Seoul (KR)

(72) Inventors: Ilha Lee, Daejeon (KR); Ji Young Hwang, Daejeon (KR); Seung Heon Lee, Daejeon (KR); Dong Hyun Oh, Daejeon (KR); Ki-Hwan Kim, Daejeon (KR); Han Min Seo, Daejeon (KR); Chan Hyoung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/547,635

(22) PCT Filed: May 9, 2016

(86) PCT No.: PCT/KR2016/004800
§ 371 (c)(1),
(2) Date: Jul. 31, 2017

(87) PCT Pub. No.: WO2016/178547
PCT Pub. Date: Nov. 10, 2016

(65) Prior Publication Data
US 2018/0149935 A1    May 31, 2018

(30) Foreign Application Priority Data

May 6, 2015 (KR) ........................ 10-2015-0063331

(51) Int. Cl.
*H01L 27/32* (2006.01)
*H01L 51/52* (2006.01)
*G02F 1/1362* (2006.01)
*G02F 1/133* (2006.01)
*G02F 1/1335* (2006.01)
*G02F 1/1343* (2006.01)
(Continued)

(52) U.S. Cl.
CPC ........ *G02F 1/136209* (2013.01); *G02F 1/133* (2013.01); *G02F 1/136* (2013.01); *G02F 1/1335* (2013.01); *G02F 1/1343* (2013.01); *G02F 1/1368* (2013.01); *G02F 1/134363* (2013.01); *G02F 1/136286* (2013.01); *G02F 2001/136222* (2013.01); *G02F 2201/08* (2013.01); *G02F 2201/38* (2013.01)

(58) Field of Classification Search
CPC ..... H01L 27/12; H01L 27/32; H01L 27/3213; H01L 27/3276; H01L 29/78; H01L 29/786; H01L 51/52; H01L 51/5281
See application file for complete search history.

(56) References Cited

U.S. PATENT DOCUMENTS

2006/0285051 A1   12/2006   Jeon et al.
2014/0055722 A1*  2/2014   Mori ................ G02F 1/133555
                                                              349/96

(Continued)

FOREIGN PATENT DOCUMENTS

EP    2 518 558 A2    10/2012
JP    2012-234179 A   11/2012
(Continued)

*Primary Examiner* — Fazli Erdem
(74) *Attorney, Agent, or Firm* — Dentons US LLP

(57) ABSTRACT

The present specification relates to a liquid crystal display device.

8 Claims, 5 Drawing Sheets

(51) Int. Cl.
*G02F 1/136* (2006.01)
*G02F 1/1368* (2006.01)

(56) References Cited

U.S. PATENT DOCUMENTS

| | | | | |
|---|---|---|---|---|
| 2014/0251429 A1* | 9/2014 | Lim | ................... | H01L 31/02246 136/256 |
| 2016/0049426 A1* | 2/2016 | Lim | ....................... | H01L 27/124 257/72 |
| 2016/0291712 A1* | 10/2016 | Lim | ........................ | G06F 3/041 |
| 2018/0024397 A1* | 1/2018 | Lee | ................... | G02F 1/133502 |
| 2018/0033893 A1* | 2/2018 | Lee | ................... | H01L 29/78633 |
| 2018/0046017 A1* | 2/2018 | Lee | ................... | G02F 1/133502 |

FOREIGN PATENT DOCUMENTS

| KR | 10-2006-0130502 A | 12/2006 |
|---|---|---|
| KR | 10-2008-0052768 A | 6/2008 |
| KR | 10-2013-0012450 A | 2/2013 |
| KR | 10-1306563 B1 | 9/2013 |
| KR | 10-2014-0004887 A | 1/2014 |

* cited by examiner

[FIG. 1]
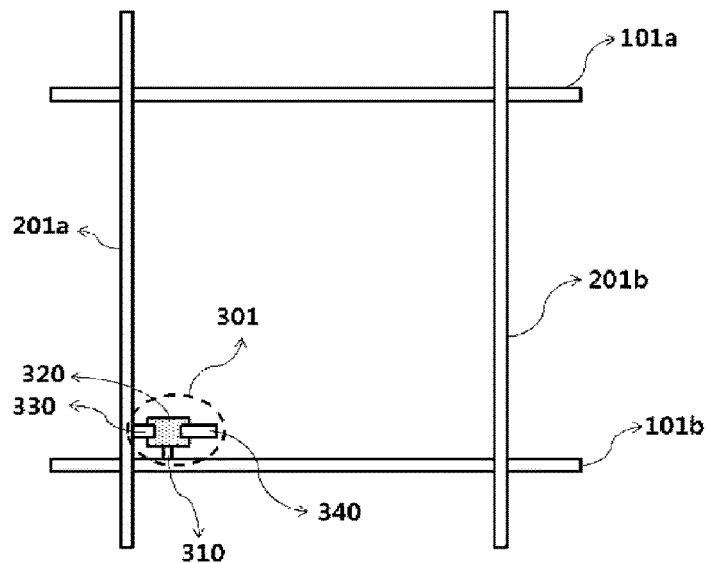
[FIG. 2]
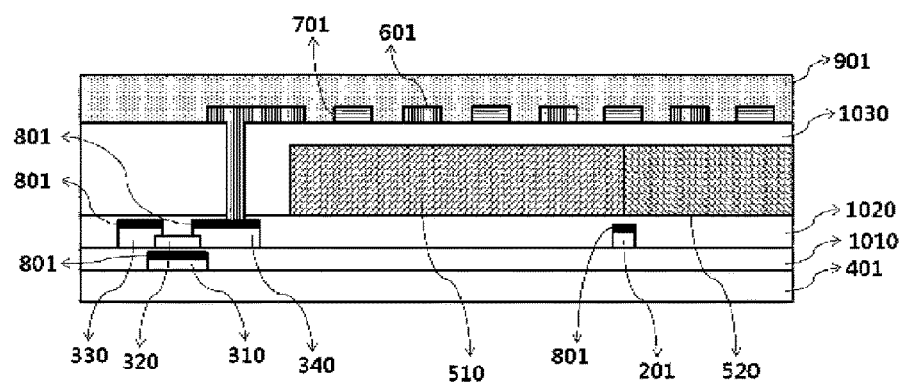

[FIG. 3]
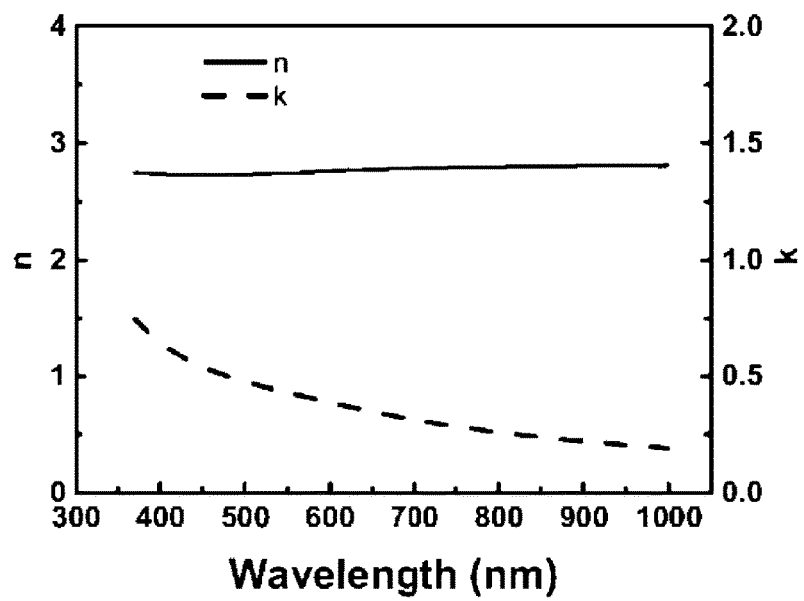
[FIG. 4]
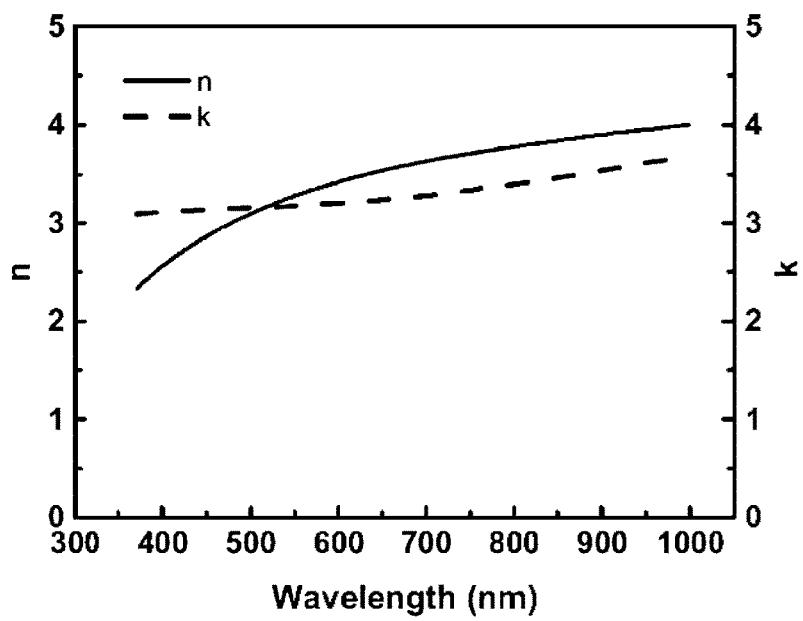

[FIG. 5]
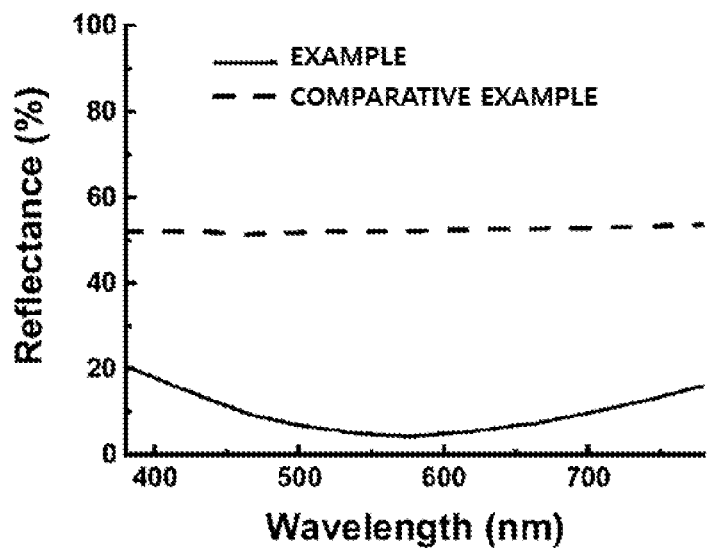
[FIG. 6]
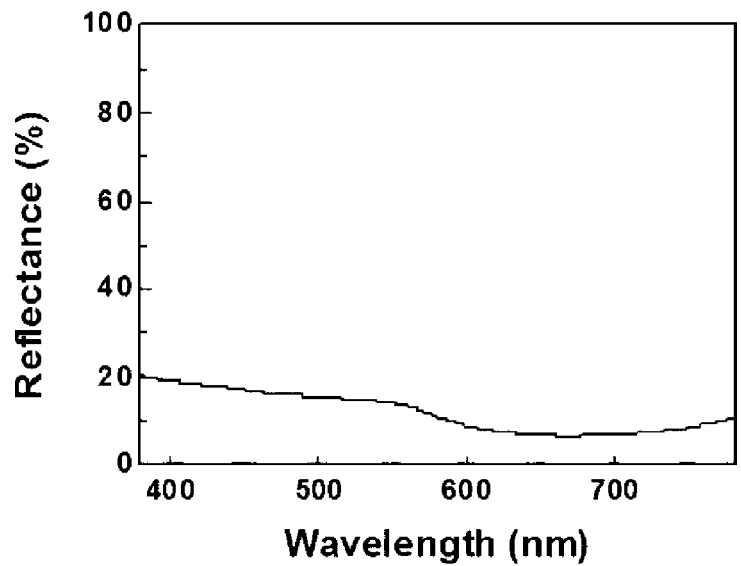

[FIG. 7]
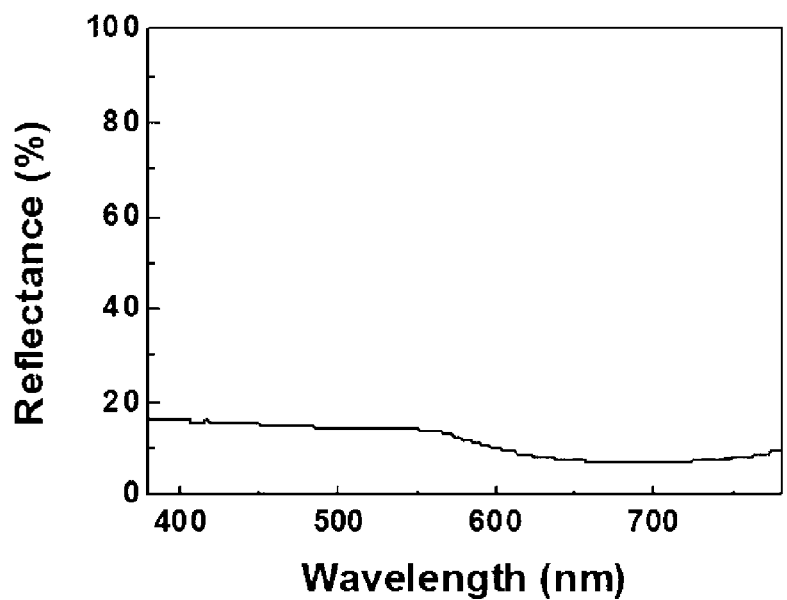
[FIG. 8]
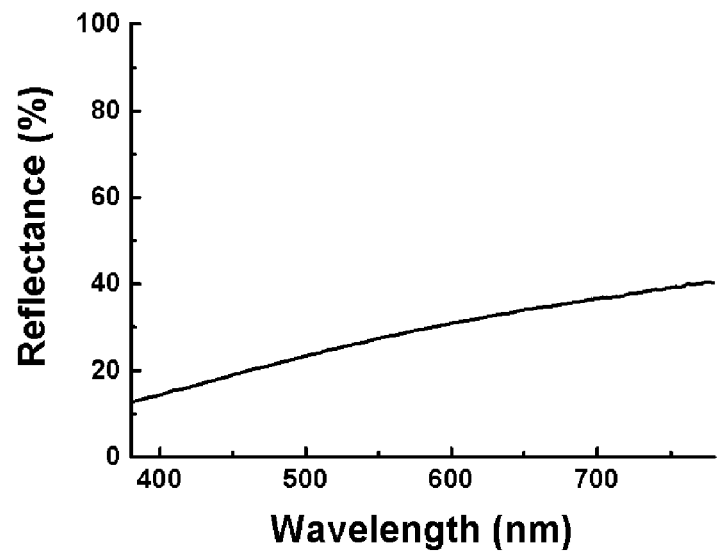

[FIG. 9]
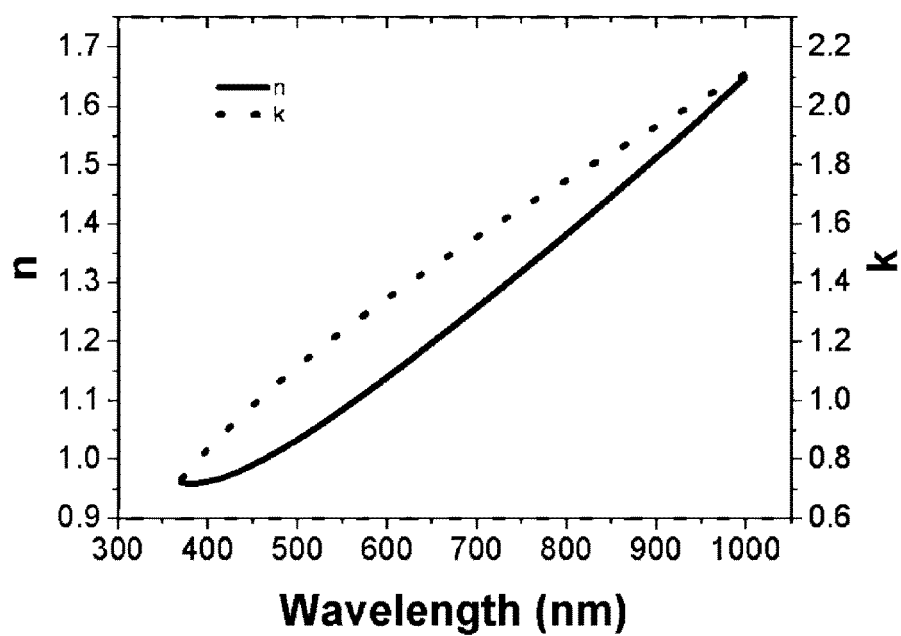

LIQUID CRYSTAL DISPLAY DEVICE

TECHNICAL FIELD

This application is a National Stage Application of International Application No. PCT/KR2016/004800 filed on May 9, 2016, which claims the benefit of Korean Patent Application No. 10-2015-0063331 filed on May 6, 2015, all of which are hereby incorporated by reference in their entirety for all purposes as if fully set forth herein.

The present relates to a liquid crystal display device.

BACKGROUND ART

Liquid crystal display devices are a most important display device used in recent multimedia society, and have been widely used from portable phones to computer monitors, laptops and televisions. As a liquid crystal display device, there is a TN mode in which a liquid crystal layer twist arranging nematic liquid crystals is placed between two orthogonal polarized plates, and an electric filed is applied in a direction perpendicular to a substrate. When a black color is displayed in such a TN mode type, double refraction caused by liquid crystal molecules occurs in an inclined viewing angle and light leakage occurs since liquid crystals are oriented in a direction perpendicular to a substrate.

In view of a viewing angle problem of such a TN mode type, an in-plane switching (IPS) mode in which two electrodes are formed on one substrate, and a liquid crystal director is controlled by a transverse electric field generated between the two electrodes has been introduced. In other words, the IPS mode type is also referred to as an in-plane switching liquid crystal display or a transverse electric field-type liquid crystal display, and by disposing electrodes in the same plane in a liquid crystal-disposed cell, the liquid crystals are lined up parallel to the transverse direction of the electrode instead of being lined up in a perpendicular direction.

In such a liquid crystal display device, an electrode and a wire line of a thin film transistor of each pixel are formed with metals, and due to high light reflectance resulted accordingly, it causes a problem of becoming an obstacle to the display screen.

DISCLOSURE

Technical Problem

The present specification is directed to providing a liquid crystal display device capable of obtaining a high-definition display by controlling a glare phenomenon caused by a wire electrode of the liquid crystal display device, and a method for manufacturing the same.

Technical Solution

One embodiment of the present specification provides a liquid crystal display device including a substrate;

a plurality of gate lines and a plurality of data lines provided to cross each other on the substrate;

a plurality of pixel regions divided by the gate lines and the data lines;

a thin film transistor provided on one side of each of the pixel regions, wherein, the thin film transistor includes a gate electrode connected to the gate line, a semiconductor layer provided on the gate electrode while being insulated with the gate electrode, a source electrode electrically connected to the data line, and a drain electrode electrically connected to a pixel electrode or a common electrode;

a color filter layer provided on each of the pixel regions;

the pixel electrode provided in each of the pixel regions and the common electrode provided corresponding to the pixel electrode; and a light reflection reducing layer provided on at least one surface of the gate electrode, the source electrode, the drain electrode, the gate line and the data line, wherein, in the light reflection reducing layer, the following Formula 1 satisfies a value of greater than or equal to 0.004 and less than or equal to 0.22.

$$\frac{(k \times t)}{\lambda} \quad \text{[Formula 1]}$$

In Formula 1, k means an extinction coefficient of the light reflection reducing layer, t means a thickness of the light reflection reducing layer, and λ means a wavelength of light.

Advantageous Effects

A liquid crystal display device according to the present specification is capable of obtaining a high-definition display by controlling light reflectance caused by a wire electrode.

DESCRIPTION OF DRAWINGS

FIG. 1 illustrates an example of one pixel region of the present specification.

FIG. 2 illustrates a section of a liquid crystal display device according to one embodiment of the present specification.

FIG. 3 is a graph showing n and k values of a light reflection reducing layer of Example 1 depending on a wavelength.

FIG. 4 is a graph showing n and k values of a MoTi layer of Comparative Example 1 depending on a wavelength.

FIG. 5 compares reflectance of Example 1 and Comparative Example 1.

FIG. 6 shows reflectance of Example 13.

FIG. 7 shows reflectance of Example 14.

FIGS. 8 and 9 show reflectance and an optical constant value obtained from a structure manufactured in Example 15.

REFERENCE NUMERAL 101a, 101b: Gate Line
201, 201a, 201b: Data Line
301: Thin Film Transistor
310: Gate Electrode
320: Semiconductor Layer
330: Source Electrode
340: Drain Electrode
401: Substrate
510, 520: Color Filter Layer
601: Common Electrode
701: Pixel Electrode
801: Light Reflection Reducing Layer
901: Liquid Crystal Orientation Layer
1010, 1020, 1030: Insulating Layer

MODE FOR DISCLOSURE

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

Hereinafter, the present specification will be described in more detail.

In the present specification, a display device is a term collectively referring to TVs, computer monitors and the like, and includes a display element forming images and a case supporting the display element.

A black matrix has been used in existing display devices in order for preventing light reflection, light leakage and the like. Recently, structures that do not use the above-mentioned black matrix have been developed by introducing a structure called a color filter on TFT array (COT or COA) forming a color filter on an array substrate together with a thin film transistor. By introducing a structure that does not use the black matrix, effects such as transmissivity enhancement, luminance enhancement and backlight efficiency improvement in a display device may be obtained. However, in a structure that does not use the black matrix, regions in which a metal electrode included in a display device is exposed increases leading to a problem caused by color and reflection properties of the metal electrode. Particularly, display devices have recently become large-sized and resolution thereof has increased, and as a result, technologies capable of reducing reflection and color properties caused by the metal electrode included in a display device described above have been required.

In view of the above, the inventors of the present disclosure have found out that, in a display device including a conductive layer such as a metal, visibility of the conductive layer is mainly affected by light reflection and diffraction properties caused by the conductive layer, and have tried to improve this phenomenon.

A liquid crystal display device according to one embodiment of the present specification introduces a light reflection reducing layer on a wire electrode such as a gate electrode, a source electrode, a drain electrode, a gate line and a data line, and therefore, is capable of greatly improving visibility decline caused by high reflectance of the wire electrode.

Furthermore, using the light reflection reducing layer has an advantage in that a black matrix does not have to be formed on a region corresponding to a thin film transistor.

Specifically, the light reflection reducing layer has a light absorption property, and therefore, may reduce light reflectance of a wire electrode by reducing the amount of light entering the wire electrode itself and the amount of light reflected from a pixel electrode and a common electrode.

One embodiment of the present specification provides a liquid crystal display device including a substrate; a plurality of gate lines and a plurality of data lines provided to cross each other on the substrate; a plurality of pixel regions divided by the gate lines and the data lines; a thin film transistor provided on one side of each of the pixel regions, wherein, the thin film transistor includes a gate electrode connected to the gate line, a semiconductor layer provided on the gate electrode while being insulated with the gate electrode, a source electrode electrically connected to the data line, and a drain electrode electrically connected to a pixel electrode or a common electrode; a color filter layer provided on each of the pixel regions; the pixel electrode provided in each of the pixel regions and the common electrode provided corresponding to the pixel electrode; and a light reflection reducing layer provided on at least one surface of the gate electrode, the source electrode, the drain electrode, the gate line and the data line, wherein, in the light reflection reducing layer, the following Formula 1 satisfies a value of greater than or equal to 0.004 and less than or equal to 0.22.

$$\frac{(k \times t)}{\lambda} \quad \text{[Formula 1]}$$

In Formula 1, k means an extinction coefficient of the light reflection reducing layer, t means a thickness of the light reflection reducing layer, and λ means a wavelength of light.

When external light enters to an electrode provided with the light reflection reducing layer, first reflected light reflected on a surface of the light reflection reducing layer is present, and second reflected light passing through the light reflection reducing layer and reflected on a lower electrode surface is present.

The light reflection reducing layer may lower light reflectance through destructive interference of the first reflected light and the second reflected light.

The inventors of the present disclosure have found out that light reflectance of the pixel electrode and the common electrode is significantly reduced through destructive interference when the light reflection reducing layer in which Formula 1 satisfies a value of greater than or equal to 0.004 and less than or equal to 0.22 is provided adjoining the pixel electrode and the common electrode, and high resolution of a display is obtained.

Specifically, the condition of destructive interference obtained by the first reflected light and the second reflected light having a phase difference of 180 degrees is as in the following Formula 2.

$$t = \frac{\lambda}{4 \cdot n} \times N \quad \text{[Formula 2]}$$

In Formula 2, t means a thickness of the light reflection reducing layer, λ means a wavelength of light, n means a refractive index of the light reflection reducing layer, and N means any odd number such as 1, 3 and 5.

First reflectance under the condition of destructive interference may be obtained as in the following Formula 3.

$$R_1 = \left[\frac{(n-1)^2 + k^2}{(n+1)^2 + k^2}\right] \quad \text{[Formula 3]}$$

In Formula 3, n means a refractive index of the light reflection reducing layer and k means an extinction coefficient of the light reflection reducing layer.

Furthermore, second reflectance under the condition of destructive interference may be obtained as in the following Formula 4.

$$R_2 = R_{metal}(1 - R_1)I_0 \exp\left(-\frac{2\pi}{n} \cdot k \cdot N\right) \quad \text{[Formula 4]}$$

In Formula 4, $R_{metal}$ means reflectance on the surface of the pixel electrode or the common electrode, $R_1$ means first reflectance in the light reflection reducing layer, $I_0$ means intensity of incident light, n means a refractive index of the light reflection reducing layer, k means an extinction coefficient of the light reflection reducing layer, and N means any odd number such as 1, 3 and 5.

According to one embodiment of the present specification, an absolute value of a difference between the first reflectance and second reflectance may be greater than or equal to 0.13 and less than or equal to 0.42.

According to one embodiment of the present specification, A may be 550 nm. In other words, it may be light with a wavelength of 550 nm.

According to one embodiment of the present specification, the gate electrode, the source electrode, the drain electrode, the gate line and the data line may be collectively referred to as a wire electrode.

According to one embodiment of the present specification, the light reflection reducing layer may be provided on a side surface opposite to a surface adjoining substrates of the gate electrode, the source electrode, the drain electrode, the gate line and the data line.

According to one embodiment of the present specification, the light reflection reducing layer may have a thickness of greater than or equal to 5 nm and less than or equal to 100 nm, and more preferably greater than or equal to 10 nm and less than or equal to 100 nm. Specifically, according to one embodiment of the present specification, the light reflection reducing layer may have a thickness of greater than or equal to 20 nm and less than or equal to 60 nm.

The light reflection reducing layer having a thickness of less than 10 nm may cause a problem of not sufficiently controlling light reflectance of the wire electrode. In addition, the light reflection reducing layer having a thickness of greater than 100 nm may lead to a problem of patterning the light reflection reducing layer being difficult.

According to one embodiment of the present specification, the light reflection reducing layer may have an extinction coefficient (k) of greater than or equal to 0.1 and less than or equal to 2 in light with a wavelength of 550 nm. Specifically, according to one embodiment of the present specification, the light reflection reducing layer may have an extinction coefficient (k) of greater than or equal to 0.4 and less than or equal to 2 in light with a wavelength of 550 nm.

When the extinction coefficient is in the above-mentioned range, light reflectance of the wire electrode may be effectively controlled, and visibility of the liquid crystal display device may be further improved accordingly.

The extinction coefficient may be measured using an ellipsometer measuring device and the like known in the art.

The extinction coefficient k is also referred to as an absorption coefficient, and may be a criterion capable of defining how strong a subject material absorbs light in a specific wavelength. Accordingly, first absorption occurs while incident light passes through the light reflection reducing layer with a thickness of t depending on the degree of k, and after second absorption occurs while light reflected by a lower electrode layer passes through the light reflection reducing layer with a thickness of t again, external reflection occurs. Accordingly, thickness and absorption coefficient values of the light reflection reducing layer act as an important factor affecting total reflectance. As a result, according to one embodiment of the present specification, a region capable of reducing light reflection in certain absorption coefficient k and thickness t ranges of the light reflection reducing layer is shown through Formula 1.

According to one embodiment of the present specification, the light reflection reducing layer may have a refractive index (n) of greater than or equal to 2 and less than or equal to 3 in light with a wavelength of 550 nm.

First reflection occurs in a material of the light reflection reducing layer having a refractive index (n) together with an extinction coefficient (k), and herein, main factors determining the first reflection are a refractive index (n) and an absorption coefficient (k). Accordingly, the refractive index (n) and the absorption coefficient (k) are closely related to each other, and the effect may be maximized in the above-mentioned range.

According to one embodiment of the present specification, light reflectance of the wire electrode provided with the light reflection reducing layer may be 50% or less and more preferably 40% or less.

According to one embodiment of the present specification, the light reflection reducing layer may include one or more types selected from the group consisting of metal oxides, metal nitrides and metal oxynitrides. Specifically, according to one embodiment of the present specification, the light reflection reducing layer may include one or more types selected from the group consisting of metal oxides, metal nitrides and metal oxynitrides as a main material.

According to one embodiment of the present specification, the metal oxide, the metal nitride and the metal oxynitride may be derived from one, two or more metals selected from the group consisting of Cu, Al, Mo, Ti, Ag, Ni, Mn, Au, Cr and Co.

According to one embodiment of the present specification, the light reflection reducing layer may include a material selected from the group consisting of copper oxide, copper nitride and copper oxynitride.

According to one embodiment of the present specification, the light reflection reducing layer may include a material selected from the group consisting of aluminum oxide, aluminum nitride and aluminum oxynitride.

According to one embodiment of the present specification, the light reflection reducing layer may include copper-manganese oxide.

According to one embodiment of the present specification, the light reflection reducing layer may include copper-manganese oxynitride.

According to one embodiment of the present specification, the light reflection reducing layer may include copper-nickel oxide.

According to one embodiment of the present specification, the light reflection reducing layer may include copper-nickel oxynitride.

According to one embodiment of the present specification, the light reflection reducing layer may include molybdenum-titanium oxide.

According to one embodiment of the present specification, the light reflection reducing layer may include molybdenum-titanium oxynitride.

According to one embodiment of the present specification, the light reflection reducing layer may be formed in a single layer, or may be formed in a multilayer of two or more layers. The light reflection reducing layer preferably exhibits achromatic colors, but is not particularly limited thereto. Herein, the achromatic color means a color appearing when light entering to a surface of an object is evenly reflected and absorbed for a wavelength of each component instead of being selectively absorbed.

FIG. 1 illustrates an example of one pixel region of the present specification. Specifically, FIG. 1 illustrates a pixel region divided by a plurality of gate lines (101*a*, 101*b*) and a plurality of data lines (201*a*, 201*b*) provided on a substrate and a thin film transistor (301) provided in the pixel region.

In addition, the gate line (101b) in the pixel region is connected to a gate electrode (310), the data line (201a) is connected to a source electrode (330), and a drain electrode (340) is connected to a common electrode (not shown) or a pixel electrode (not shown) in the pixel region.

FIG. 2 illustrates a section of a liquid crystal display device according to one embodiment of the present specification. Specifically, a thin film transistor (301) formed with a gate electrode (310), a semiconductor layer (320), a source electrode (330) and a drain electrode (340) is provided on a substrate, a pixel region is divided by a gate line (not shown) connected to the gate electrode and a data line (201), and a color filter layer (510, 520) is provided in each of the pixel regions, and after a common electrode (601) and a pixel electrode (701) are provided side by side on the color filter layer (510, 520) in each of the pixel regions, a liquid crystal orientation layer (901) is provided. In FIG. 2, a liquid crystal layer provided on the liquid crystal orientation layer (901) is not shown. Furthermore, FIG. 2 shows a light reflection reducing layer (801) being provided on the gate electrode (310), the source electrode (330), the drain electrode (340), the gate line (not shown) and the data line (201). However, the liquid crystal display device according to one embodiment of the present specification may be used in various structures in addition to the structure shown in FIG. 2.

According to one embodiment of the present specification, the pixel electrode and the common electrode each include a plurality of conductive lines, and the pixel electrode and the common electrode may be provided in parallel in the pixel region.

Specifically, according to one embodiment of the present specification, the pixel electrode and the common electrode may be alternately provided in each of the pixel regions. Accordingly, a horizontal electric field is formed in each of the pixel regions to drive liquid crystal molecules.

To the common electrode, a common voltage, a standard voltage for driving liquid crystals, is supplied, and accordingly, a horizontal electric field is formed between the pixel voltage signal-supplied pixel electrode and the common voltage-supplied common electrode, and liquid crystal molecules arranged in a parallel direction rotate by dielectric anisotropy. In addition, images may be obtained by changing transmissivity of light passing through the pixel region depending on the degree of rotation of the liquid crystal molecules.

According to one embodiment of the present specification, at least one of the pixel electrode and the common electrode may be provided on an overlapped portion of the color filter layer.

The color filter layer provided in each of the pixel regions may be a red, green or blue color filter layer. In addition, a white color filter layer may be provided in any one of the pixel regions as necessary. The red color filter layer, the green color filter layer, the blue color filter layer and the white color filter layer each form one unit pixel, and the one unit pixel may display images through light of colors emitted after penetrating the red color filter layer, the green color filter layer and the blue color filter layer.

According to one embodiment of the present specification, the thin film transistor is provided with a gate electrode branched off from the gate line, and a semiconductor layer provided by interposing an insulating layer on the gate electrode. Furthermore, the semiconductor layer is connected to a source electrode and a drain electrode by interposing an ohmic contact layer, and the source electrode is connected to the data line.

The gate line supplies scan signals from a gate driver, and the data line supplies video signals from a data driver.

Hereinafter, the present disclosure will be described in detail with reference to examples. However, the following examples are for illustrative purposes only, and the scope of the present disclosure is not limited thereto.

EXAMPLE 1

A MoTi layer having a thickness of 30 nm was formed on a glass substrate through a sputtering method using a MoTi (50:50 at %) alloy target, and a MoTi oxynitride layer having a thickness of 40 nm was formed thereon through a reactive sputtering method using a MoTi (50:50 at %) target. Reflectance of the deposited film was 9.4%.

A MoTi oxynitride single layer was formed on a glass substrate in the same manner in order to obtain a light absorption coefficient (k) value. After that, a refractive index and a light absorption coefficient were measured using an ellipsometer. n and k values at 380 nm to 1000 nm were as shown in FIG. 3, and the light absorption coefficient value at 550 nm was 0.43. When putting these values in Formula 1, a value of 0.031 was calculated.

EXAMPLES 2 TO 12

In Examples 2 to 12, optical simulation was performed through the MacLeod program. The optical constant value of Example 1 was put on the program to obtain a reflectance value when the MoTi oxynitride layer had a thickness as follows, and the values are shown in the following Table 1.

TABLE 1

| | MoTi Oxynitride Layer Thickness (nm) | Value of Formula 1 | Reflectance (%) |
|---|---|---|---|
| Example 2 | 5.5 | 0.0043 | 52 |
| Example 3 | 10 | 0.0078 | 46 |
| Example 4 | 15 | 0.0117 | 39 |
| Example 5 | 20 | 0.0156 | 31 |
| Example 6 | 25 | 0.0195 | 23 |
| Example 7 | 30 | 0.0235 | 18 |
| Example 8 | 35 | 0.0274 | 14 |
| Example 9 | 60 | 0.0469 | 17 |
| Example 10 | 70 | 0.0547 | 23 |
| Example 11 | 80 | 0.0625 | 27 |
| Example 12 | 100 | 0.078 | 31 |

COMPARATIVE EXAMPLE 1

A MoTi layer having a thickness of 30 nm was formed on a glass substrate through a sputtering method using a MoTi (50:50 at %) alloy target. Reflectance of the deposited film was 52%. A MoTi single layer was formed on a glass substrate in the same manner in order to obtain a light absorption coefficient (k) value. After that, a refractive index and a light absorption coefficient were measured using an ellipsometer. n and k values at 380 nm to 1000 nm were as shown in FIG. 4, and the light absorption coefficient value at 550 nm was 3.18. When putting these values in Formula 1, a value of 0.23 was calculated. A graph comparing the reflectance of Example 1 and Comparative Example 1 is shown in FIG. 5.

COMPARATIVE EXAMPLE 2

An experiment was carried out in the same manner as in Example 1 except that the MoTi oxynitride layer thickness was 4 nm. The value of Formula 1 was calculated as 0.003. The reflectance was 53%.

EXAMPLE 13

A Cu layer having a thickness of 60 nm was formed as a conductive layer on a glass substrate through a DC sputtering method using a Cu single target, and a light reflection reducing layer having a thickness of 35 nm and including MoTi$_a$N$_x$O$_y$ (0<a≤2, 0<x≤3, 0<y≤2) was formed through a reactive DC sputtering method using a MoTi (50:50 at %) alloy target. Wavelength-dependent total reflectance was measured using Solidspec 3700 (UV-Vis spectrophotometer, Shimadzu Corporation), and the results are shown in FIG. 6. The value of Formula 1 of the light reflection reducing layer was 0.059.

EXAMPLE 14

A Cu layer having a thickness of 60 nm was formed as a first conductive layer on a glass substrate through a DC sputtering method using a Cu single target, and a MoTi layer having a thickness of 20 nm was formed as a second conductive layer through a DC sputtering method using a MoTi (50:50 at %) alloy target, and using the same target, a light reflection reducing layer having a thickness of 35 nm and including MoTi$_a$N$_x$O$_y$ (0<a≤2, 0<x≤3, 0<y≤2) was formed through a reactive DC sputtering method. Wavelength-dependent total reflectance was measured using Solidspec 3700 (UV-Vis spectrophotometer, Shimadzu Corporation), and the results are shown in FIG. 7. The value of Formula 1 of the light reflection reducing layer was 0.059.

EXAMPLE 15

An experiment was carried out in the same manner as in Example 1 except that an Al layer depositing Al was used instead of the MoTi layer, and aluminum oxynitride (k=1.24) was used instead of the MoTi oxynitride to form into a thickness of 87 nm. Herein, the value of Formula 1 was 0.2, and the reflectance was approximately 28%. FIGS. 8 and 9 show the reflectance and the optical constant value obtained from the structure.

Through the test results of the examples and the comparative examples, it was identified that excellent effects of the light reflection reducing layer were obtained in the structures described in the claims of the present application.

The invention claimed is:

1. A liquid crystal display device comprising:
a substrate;
a plurality of gate lines and a plurality of data lines provided to cross each other on the substrate;
a plurality of pixel regions divided by the gate lines and the data lines;
a thin film transistor provided on one side of each of the pixel regions, wherein, the thin film transistor includes a gate electrode connected to the gate line, a semiconductor layer provided on the gate electrode while being insulated with the gate electrode, a source electrode electrically connected to the data line, and a drain electrode electrically connected to a pixel electrode or a common electrode;
a color filter layer provided on each of the pixel regions;
the pixel electrode provided in each of the pixel regions and the common electrode provided corresponding to the pixel electrode; and
a light reflection reducing layer provided on at least one surface of the gate electrode, the source electrode, the drain electrode, the gate line and the data line,
wherein, in the light reflection reducing layer, the following Formula 1 satisfies a value of greater than or equal to 0.004 and less than or equal to 0.22:

$$\frac{(k \times t)}{\lambda} \quad \text{[Formula 1]}$$

wherein, in Formula 1, k means an extinction coefficient of the light reflection reducing layer, t means a thickness of the light reflection reducing layer, and λ means a wavelength of light.

2. The liquid crystal display device of claim 1, wherein the light reflection reducing layer has a thickness of greater than or equal to 10 nm and less than or equal to 100 nm.

3. The liquid crystal display device of claim 1, wherein the light reflection reducing layer has an extinction coefficient (k) of greater than or equal to 0.1 and less than or equal to 2 in light with a wavelength of 550 nm.

4. The liquid crystal display device of claim 1, wherein the light reflection reducing layer has a refractive index (n) of greater than or equal to 2 and less than or equal to 3 in light with a wavelength of 550 nm.

5. The liquid crystal display device of claim 1, wherein light reflectance of the electrode provided with the light reflection reducing layer is 50% or less.

6. The liquid crystal display device of claim 1, wherein the light reflection reducing layer includes one or more types selected from the group consisting of metal oxides, metal nitrides and metal oxynitrides.

7. The liquid crystal display device of claim 6, wherein the metal oxide, the metal nitride and the metal oxynitride are derived from one, two or more metals selected from the group consisting of Cu, Al, Mo, Ti, Ag, Ni, Mn, Au, Cr and Co.

8. The liquid crystal display device of claim 1, wherein the pixel electrode and the common electrode each include a plurality of conductive lines, and the pixel electrode and the common electrode are provided in parallel to each other in the pixel region.

\* \* \* \* \*